US012645908B2

(12) United States Patent
Forster et al.

(10) Patent No.: US 12,645,908 B2
(45) Date of Patent: Jun. 2, 2026

(54) MICROWAVE TOLERANT RFID SYSTEM AND COMPONENTS

(71) Applicant: Avery Dennison Retail Information Services LLC, Mentor, OH (US)

(72) Inventors: Ian J. Forster, Chelmsford (GB);
Norman A. Howard, Ilford (GB);
Panagiotis Petridis, Chelmsford (GB);
Muhammad Rizwan, Chelmsford (GB)

(73) Assignee: Avery Dennison Retail Information Services LLC, Mentor, OH (US)

( * ) Notice: Subject to any disclaimer, the term of this patent is extended or adjusted under 35 U.S.C. 154(b) by 0 days.

(21) Appl. No.: 18/560,204

(22) PCT Filed: Jun. 24, 2022

(86) PCT No.: PCT/IB2022/055847
§ 371 (c)(1),
(2) Date: Nov. 10, 2023

(87) PCT Pub. No.: WO2022/269541
PCT Pub. Date: Dec. 29, 2022

(65) Prior Publication Data
US 2024/0232568 A1     Jul. 11, 2024

Related U.S. Application Data

(60) Provisional application No. 63/214,703, filed on Jun. 24, 2021.

(51) Int. Cl.
G06K 19/077 (2006.01)

(52) U.S. Cl.
CPC ... G06K 19/07786 (2013.01); G06K 19/0773 (2013.01); G06K 19/07767 (2013.01); G06K 19/07771 (2013.01)

(58) Field of Classification Search
CPC ......... G06K 19/07786; G06K 19/0773; G06K 19/07767; G06K 19/07771;
(Continued)

(56) References Cited

U.S. PATENT DOCUMENTS 7,535,366 B2     5/2009  Egbert et al.
9,390,367 B2 *   7/2016  Machado ............... H01Q 9/065
(Continued)

FOREIGN PATENT DOCUMENTS

CN        210199808 U  *  3/2020
JP        2004-295297     10/2004
(Continued)

OTHER PUBLICATIONS

International Search Report and Written Opinion dated Sep. 8, 2022 issued in corresponding IA No. PCT/IB2022/055847 filed Jun. 23, 2022.
(Continued)

*Primary Examiner* — Sonji N Johnson

(57) ABSTRACT

In some embodiments, a radio frequency identification (RFID) system may include at least one Ultra High Frequency (UHF) antenna component, a conductive loop having a largest dimension that is smaller than the wavelength of radiation transmitted at a Microwave Frequency (MW). The conductive loop may define a gap and an RFID chip may be electrically coupled to the conductive loop. The conductive loop may be configured to be resonant at an Ultra High Frequency (UHF) and less resonant at Microwave Frequency (MW). The antenna component may be selected from the group consisting of a dipole antenna, a monopole antenna, a loop antenna, or a slot antenna.

51 Claims, 15 Drawing Sheets

(58) Field of Classification Search
CPC ............ B65D 2203/10; B65D 81/3446; H01Q
1/2225; H01Q 7/005; H01Q 7/04; H04B
5/26; H04B 5/43
See application file for complete search history.

(56) References Cited

U.S. PATENT DOCUMENTS

| | | | |
|---|---|---|---|
| 10,311,355 B1 | 6/2019 | Hahn et al. | |
| 2002/0183882 A1* | 12/2002 | Dearing | G06Q 10/087 |
| | | | 705/28 |
| 2006/0054710 A1* | 3/2006 | Forster | H01Q 1/52 |
| | | | 343/745 |
| 2006/0158380 A1 | 7/2006 | Son et al. | |
| 2007/0132593 A1 | 6/2007 | Yamazaki | |
| 2008/0143480 A1* | 6/2008 | Egbert | H04B 5/77 |
| | | | 340/10.1 |
| 2008/0150719 A1 | 6/2008 | Cote et al. | |
| 2009/0302121 A1 | 12/2009 | Shioya et al. | |
| 2010/0097191 A1 | 4/2010 | Yamagajo et al. | |
| 2011/0063184 A1 | 3/2011 | Furumura et al. | |
| 2014/0176082 A1* | 6/2014 | Visser | H02J 50/27 |
| | | | 307/104 |
| 2017/0117607 A1 | 4/2017 | Louzir et al. | |
| 2018/0189623 A1 | 7/2018 | Forster et al. | |
| 2020/0006840 A1 | 1/2020 | Forster | |
| 2020/0034678 A1 | 1/2020 | Yazaki | |
| 2021/0125017 A1* | 4/2021 | Kato | G06K 19/0701 |
| 2022/0374671 A1* | 11/2022 | Huhtasalo | H01Q 1/38 |
| 2022/0405543 A1* | 12/2022 | Yli-Peltola | G06K 19/07786 |

FOREIGN PATENT DOCUMENTS

| | | | |
|---|---|---|---|
| JP | 2021-56650 | | 4/2021 |
| JP | 2021056650 A | * | 4/2021 |
| WO | 2008/081699 | | 7/2008 |
| WO | 2008/126649 | | 10/2008 |
| WO | 2019/009066 | | 1/2019 |
| WO | 2020/021767 | | 1/2020 |
| WO | 2021/079265 | | 4/2021 |
| WO | 2021/079266 | | 4/2021 |

OTHER PUBLICATIONS

International Preliminary Report on Patentability dated Dec. 14, 2023 issued in corresponding IA No. PCT/IB2022/055847 filed Jun. 23, 2022.

* cited by examiner

400

500

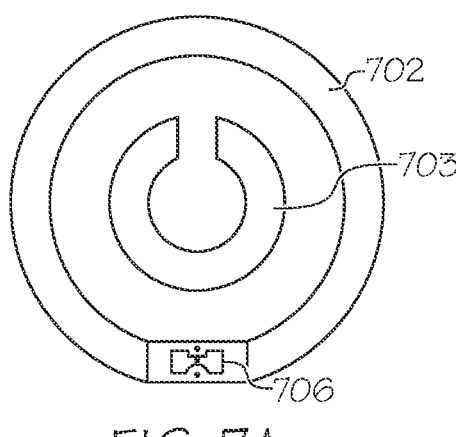
FIG. 7A
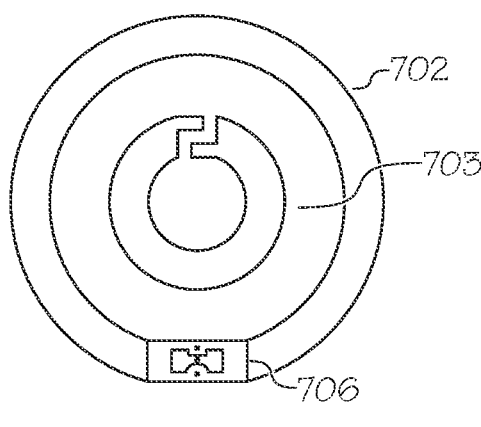
FIG. 7B
FIG. 7C

| 1 |
|---|
| 2 |
| 3 |
| 4 |

MICROWAVE TOLERANT RFID SYSTEM AND COMPONENTS

CROSS-REFERENCE TO RELATED APPLICATIONS

The present application is a national stage application under 35 USC 371 of International Application No. PCT/IB2022/055847, which was published in English on Dec. 29, 2022, and claims priority to U.S. Provisional Application No. 63/214,703 filed Jun. 24, 2021, both of which are incorporated herein by reference in their entireties.

FIELD

The present disclosure relates generally to an RFID system, and in particular to an RFID system and tags that exhibit resistance to damage caused by microwave emissions. The present disclosure also describes methods of utilizing an RFID system for far field communication enabling inventory check for fast foods intended to be cooked by microwave exposure or for automatic check out at point of sale counters post microwave cooking without needing manual intervention.

BACKGROUND

Generally stated, RFID (radio-frequency identification) is the use of electromagnetic energy to stimulate a responsive device (known as an RFID "tag" or transponder) to identify itself and, in some cases, provide additionally stored data in the tag. RFID tags typically include a semiconductor device commonly called the "chip" on which are formed a memory and operating circuitry; the chip is in turn connected to an antenna. Typically, RFID tags act as transponders, providing information stored in the chip memory in response to a radio frequency ("RF") interrogation signal received from a reader, also referred to as an interrogator which can operate in near field or in far field communication setup. In the case of passive RFID devices, the energy of the interrogation signal also provides the necessary energy to operate the RFID tag device.

RFID tags may be incorporated into or attached to articles to be tracked. In some cases, the tag may be attached to the outside of an article with adhesive, tape, or other means and in other cases, the tag may be inserted within the article, such as being included in the packaging, located within the container of the article, or sewn into a garment. The RFID tags are manufactured with a unique identification number which is typically a simple serial number of a few bytes with a check digit attached. This identification number may be incorporated into the tag during manufacture. The user cannot alter this serial/identification number and manufacturers guarantee that each serial number is used only once. Such read-only RFID tags typically are permanently attached to an article to be tracked and, once attached, the serial number of the tag is associated with its host article in a computer database.

Currently, many of the RFID tags implemented in food items to be cooked in a microwave oven cannot survive the high-field emissions of a microwave oven. RFID tags are often destroyed in the microwave oven cavity, causing damage to both the RFID tag and the food item to which the RFID tag is attached. RFID tags generally operating at High Frequency (HF, 13.56 MHz or between 3 and 30 MHz) and at Ultra High Frequency (UHF, 860 to 928 MHz or in some embodiments, 300 MHz to 3 GHz) are especially damaged due to a high voltage generated when the RFID tag antenna is exposed to a frequency of about 2.45 GHz or more operating in the microwave. The high voltage may lead to arcing, sparking, flashing, charring, and deformation of the package associated with the tag. Eventually, the package or container associated with the RFID or the microwave oven may even catch fire or damage the oven.

Some solutions have been proposed to mitigate the above problem. However, such arrangements and solutions do not completely alleviate the problem and there can still be chances of damage because of voltage build up as a result of microwave exposure, and such systems may have unacceptable levels of interference. Additionally, the arrangement may have some interference in the response efficiency of the RFID tag while operating in the HF and UHF frequencies for a successful read operation or response communication.

Thus, there exists a need in the market for RFID system and tags and labels that can efficiently operate in the HF and UHF range while remaining tolerant to microwave emission, so as to enable microwave cooking of a food item with an RFID device, and communication with the tag or other RFID device post-microwave cooking.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

One aspect of the subject matter relates to an RFID tag tolerant to high-field emissions. The RFID tag comprises a conductive loop configured to couple with a UHF antenna component. The conductive loop defines a gap and an RFID chip is electrically coupled to the conductive loop across the gap. The conductive loop is configured with a dimension that allows higher resonance at an Ultra High Frequency and a lower or minimal resonance at Microwave Frequency.

One aspect of the subject matter relates to a radio frequency identification (RFID) system and RFID tag which is tolerant to high-energy fields. The RFID system includes one or more Ultra High Frequency (UHF) antenna components, an RFID tag comprising a conductive loop that defines a gap, and an RFID chip electrically coupled to the conductive loop. The conductive loop is configured with a dimension that allows higher resonance at an Ultra High Frequency and a lower or minimal resonance at Microwave Frequency. The RFID system enables both far field and near field communication.

Another aspect of the subject matter relates to a method of utilizing a conductive loop capable of radio frequency communication while being tolerant to Microwave Frequency exposure. The method includes the steps of securing the conductive loop comprising a RFID chip to a merchandising package intended to be cooked by exposure to Microwave Frequency, conducting an inventory reading through a far field radio frequency communication by coupling the conductive loop to at least one Ultra High Frequency (UHF) antenna; cooking the merchandising package by exposing the merchandising package to a Microwave Frequency (MW) in a microwave cavity; and reading the RFID chip directly in a near field by employing a near field reader. The conductive loop is configured with a dimension that allows higher resonance at an Ultra High Frequency (UHF) and minimal resonance at Microwave Frequency (MW).

In some embodiments, the radio frequency identification (RFID) system may include at least one Ultra High Frequency (UHF) antenna component, and a conductive loop having a largest dimension that is smaller than the wavelength of radiation transmitted at a Microwave Frequency (MW). The conductive loop may define a gap and an RFID chip may be electrically coupled to the conductive loop across the gap, and the conductive loop may be sized to be resonant at an Ultra High Frequency (UHF) and less resonant at Microwave Frequency (MW).

In some embodiments, the antenna component is selected from the group consisting of a dipole antenna, a monopole antenna, a loop antenna, or a slot antenna. In proximity of the antenna component, the conductive loop exhibits primary resonance at an Ultra High Frequency (UHF) band and secondary resonance at a Microwave Frequency (MW) band. The conductive loop may be magnetically coupled to the antenna component. In few embodiments, the conductive loop and the antenna component are positioned relative to each other to cause the conductive loop to have peak resonance within the Ultra High Frequency (UHF) band and minimum resonance within the Microwave Frequency (MW) band.

In some embodiments, the maximum dimension of the conductive loop is up to 30% of the longest wavelength of radiation transmitted within the Microwave Frequency band. In other embodiments, the maximum dimension of the conductive loop is up to 25% of the longest wavelength of radiation transmitted within the Microwave Frequency band. In few other embodiments, the maximum dimension of the conductive loop is up to 20% of the longest wavelength of radiation transmitted within the Microwave Frequency band. The maximum dimension of the conductive loop is up to 15% of the longest wavelength of radiation transmitted within the Microwave Frequency band in other embodiments.

In some embodiments, a portion of the antenna component forms a contour around the conductive loop, creating a planar shielding around the conductive loop.

In some embodiments, the conductive loop has a first region that creates a first peak resonance within the Ultra High Frequency (UHF) band, and a second region that causes a second peak resonance within the Microwave Frequency (MW) band. The conductive loop may be configured to have peak resonance within the Ultra High Frequency (UHF) band at the location of minimum resonance at the Microwave Frequency (MW).

In some embodiments, the conductive loop is a planar single turn loop. In other embodiments, the conductive loop is a planar multi-turn loop. The conductive loop may be a non-planar solenoid coil in other embodiments.

In some embodiments, the conductive loop encloses a smaller conductive loop, the smaller conductive loop defining an opening. In other embodiments, the conductive loop encloses a conductive disk. In some other embodiments, the conductive loop encloses multiple embedded loops, at least one of which may include an element of a parasitic capacitor or an interdigital capacitor.

In some embodiments, the RFID system includes a second conductive loop having a largest dimension larger than the largest dimension of the conductive loop. In certain embodiments, the second conductive loop is positioned adjacent one side of the antenna component and the conductive loop is positioned on the opposite side of the antenna component. The second conductive loop may be configured to operate at Microwave Frequency (MW) and to direct energy away from the conductive loop by adsorbing microwave energy. The second conductive loop may be a split ring resonator. In one embodiment, the second conductive loop and the conductive loop may be coupled to the antenna component at a common coupling position. In another embodiment, the conductive loop may be coupled to the antenna component at a different coupling position than the second conductive loop.

In some embodiments, the RFID system may include a plurality of trap loops along one side of the antenna component, and the conductive loop on the opposite side of the antenna component. Each trap loop may be configured to have the same or a different resonance frequency in the Microwave Frequency band.

In some embodiments, the RFID system may include a shielding structure electrically coupled to the conductive loop across the gap, and around the RFID chip. The shielding structure may include a shielding conductor and a shielding dielectric, and the shielding dielectric may be positioned at least partially between the shielding conductor and the RFID chip.

In some embodiments, the antenna component may be formed utilizing a plurality of conductive loops each configured to have reduced interaction with radiation within the Microwave Frequency (MW) band, and each conductive loop may be configured to couple to at least an adjacent conductive loop by resonating at Ultra High Frequency (UHF).

In some embodiments, the conductive loop is configured to have a first peak coupling position at Ultra High Frequency (UHF) and a second peak coupling position at Microwave Frequency (MW). The length of the conductive loop from the first peak position to the second peak position may be configured to create anti-phase cancelling radiation. In this embodiment, since the length between the coupling positions is smaller compared to a wavelength at 915 MHz and since UHF induced currents are not anti-phase, the energy at 915 MHZ couples normally.

In some embodiments, the type of radio frequency communication of the conductive loop is far field communication, and the conductive loop is configured to couple to an Ultra High Frequency antenna component. The coupling between the Ultra High Frequency antenna component and the loop may be a magnetic coupling. The maximum dimension of the conductive loop may be up to 30% of the wavelength of Microwave Frequency (MW).

In some embodiments, a method of utilizing the conductive loop for radio frequency communication with tolerance to Microwave Frequency exposure may include receiving a microwavable merchandising package having a conductive loop intended to resist exposure to Microwave Frequency, while still operating at UHF. The conductive loop comprises an RFID chip, and is configured to be operable at an Ultra High Frequency (UHF). The conductive loop is less resonant at Microwave Frequency (MW).

In some embodiments, the method may include conducting an inventory reading through a far field radio frequency communication by coupling the conductive loop to at least one Ultra High Frequency (UHF) antenna. The method may include cooking the microwavable merchandising package by exposing the merchandising package to a Microwave Frequency (MW) radiation in a microwave cavity. The method may include reading the RFID chip associated with the conductive loop directly in a near field communication employing a near field reader. The conductive loop may define a gap and the RFID chip may be electrically coupled to the conductive loop around the gap.

In some embodiments, the merchandising package may include a fast food item. The merchandising package may be stored in a refrigerator and may be inventoried using a remote reader using far field communication. The conductive loop secured on the merchandising package may be read at a point of sale terminal to charge a consumer post the Microwave Frequency (MW) exposure. The conductive loop accompanying the RFID chip may exhibit limited interaction with Microwave exposure, and may be configured to avoid destructive concentration of field current and overheating.

The embodiments of the present disclosure described above and below are not intended to be exhaustive or to limit the invention to the precise forms disclosed in the following detailed description. Rather, the embodiments are chosen and described so that others skilled in the art may appreciate and understand the principles and practices of the present disclosure.

In this respect, before explaining at least one embodiment of the disclosure in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phrases and terminology employed herein are for the purpose of the description and should not be regarded as limiting.

BRIEF DESCRIPTION OF THE DRAWINGS

These, as well as other objects and advantages of this invention, will be more completely understood and appreciated by referring to the following more detailed description of the preferred exemplary embodiments of the invention in conjunction with the accompanying drawings, of which:

FIGS. 7A-7C illustrate embodiments of the conductive loop with additional internal metallic structures.

DETAILED DESCRIPTION

The apparatuses and methods disclosed in this document are described in detail by way of examples and with reference to the figures. Unless otherwise specified, like numbers in the figures indicate references to the same, similar, or corresponding elements throughout the figures. It will be appreciated that modifications to disclosed and described examples, arrangements, configurations, components, elements, apparatuses, methods, materials, etc. can be made and may be desired for a specific application. In this disclosure, any identification of specific shapes, materials, techniques, arrangements, etc. are either related to a specific example presented or are merely a general description of such a shape, material, technique, arrangement, etc. Identifications of specific details or examples are not intended to be, and should not be, construed as mandatory or limiting unless specifically designated as such. Selected examples of apparatuses and methods are hereinafter disclosed and described in detail with reference made to the figures.

Figure 1:
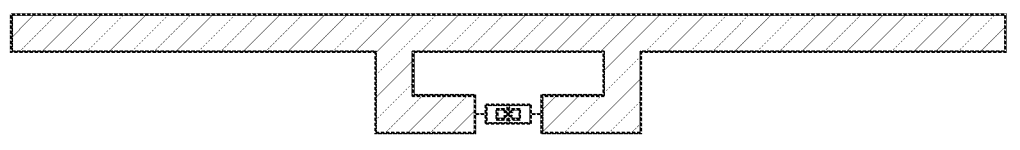
FIG. 1 depicts a prior art design of an RFID tag consisting of a dipole antenna and an RFID chip coupled to the antenna and operating at UHF frequencies.

Some conventional RFID tags when exposed to a microwave field, may suffer one or more failures such as occurrence of arc across the chip because of high voltage build up resulting from the interaction with the microwave field, overheating of areas of the tag antenna, and destructive concentration of field, potentially causing the tag antenna to catch fire. For example, FIG. 1 represents a prior art design of an RFID tag consisting of a dipole antenna and an RFID chip coupled to the antenna, which may operate at UHF frequencies. High-field energy such as those generated by a microwave operating at a power level of 800 watts or more may result in generation of very high voltage across the RFID gap around which the RFID chip of FIG. 1 is coupled. Under some circumstances, the prior art RFID tag will experience overheating, arcing, or catching fire. Some prior art RFID tags may be microwaved without causing the above problems, but may still be rendered non-functional, making it difficult to use for inventory control in a store or restaurant set up and automatic checkout through point of purchase counters.

The present disclosure relates generally to a radio-frequency identification ("RFID") system and RFID tag enabling RFID communication that can withstand high-emission field exposures such as, but not limited to that of a microwave oven. Some embodiments involve a method of utilizing a high-emission field tolerant RFID tag to control aspects of a heating process, such as by a microwave. Specifically, for some embodiments, the RFID tag does not need to be removed from a product or food item before cooking or heating in an apparatus such as a microwave and the RFID tag remains unaffected after high-emission exposure for enabling radio frequency communication. The microwave safe RFID tag of the present disclosure prevents an arc from being produced, and therefore can be placed inside a microwave oven without damaging the product or food item to which it is attached. Therefore, the RFID tag can be read or interrogated by an RFID reader system regardless of occurrence of one or more microwave exposure events. For some embodiments, the RFID system and tag of the present subject matter enables item-level tagging and tracking of merchandise items such as ready-to-cook items/meals. For various embodiments, the RFID tags accompanying a food item need not be removed from the food package prior to microwave heating.

Figure 2:
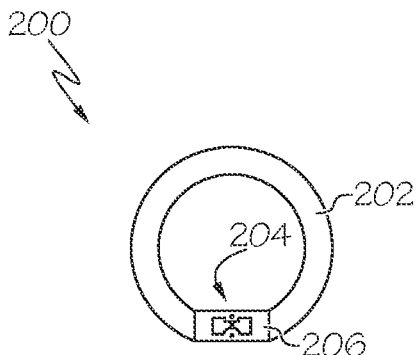
FIG. 2 depicts an embodiment of the present disclosure involving a conductive loop along with an RFID chip.

The present subject matter provides a specifically designed RFID tag capable of withstanding high-field emission such as microwave. The RFID tag (200) is in the form of a conductive loop 202 of small dimension (D) which is represented through the illustration in FIG. 2. The conductive loop 202 defines a gap 204, and an RFID chip 206 is electrically coupled across the gap 204. The conductive loop is of such a dimension as to remain resonant at Ultra High Frequency (UHF) and prevent or limit resonance at high-field emission such as at Microwave frequency (MW).

In some embodiments, the conductive loop 202 is generally circular. However, other structures or shapes are possible, and avoidance of sharp turns may be beneficial. For various embodiments, having a constant and/or gradually changing radius for a circular or rounded shape helps prevent current build up in parts of the conductive loop 202 during high-field exposure. For various embodiments, limiting the size and/or the overall dimension of the conductive loop, such as through control of the maximum dimension, may help to limit interaction with certain high-field emissions, such as microwave radiation from a microwave.

In various embodiments of the conductive loop 202, the maximum dimension of the loop is limited to being up to 30%, or 25%, or 20%, or 15%, or 10%, or 5%, or 1%, or 0.5%, or 0.1% of the wavelength at 2450 MHz (e.g. 12-19 mm), or any of the subranges between two or more of the percentages listed above (e.g., between 0.1% and 5% and/or between 15% and 30%). As a result, for various embodiments, the conductive loop 202 may have reduced interaction with the 2450 MHz field in a microwave oven. It has been found that, for some embodiments, items which are smaller in dimension than the wavelength of an electromagnetic field do not tend to interact significantly with that field. For various embodiments, the smaller the dimension compared to the wavelength, the lesser the interaction with the field having that wavelength. However, although the dimension or size of a component can be theoretically reduced to any extent, such reduction may have an adverse impact on the component's ability to operate in a desired electromagnetic field, such as at Ultra High frequency (UHF). UHF frequency, for example, may lie in the range of approximately 860 MHz to 930 MHz, and the antenna receiving incident power from an RFID reader may need to pick up and convert it to a voltage across the RFID chip to allow it to respond.

In an exemplary embodiment, the maximum dimension of the conductive loop 202 is limited to up to 15% of the wavelength at 2450 MHz, i.e. approximately 18.3 mm or less, and hence has reduced interaction with the 2450 MHz field in a microwave oven.

In some embodiments, the conductive loop 202 exhibits primary resonance at Ultra High Frequency (UHF) band. The conductive loop 202 exhibits secondary resonance in the Microwave Frequency (MW) band.

For various embodiments of an RFID tag having a conductive loop configured to enable high-field emission tolerance, factors affecting microwave tolerance and/or improved transmission or receipt of signals in other bands may include one or more of i) minimizing the overall shape and largest dimension or diameter of the conductive loop to minimize interaction with high-field energy, ii) achieving a resonance in the Ultra High Frequency (UHF) frequency band to allow the conductive loop to be coupled to a suitable UHF antenna creating a tag for far field communication, such as by increasing a largest dimension of a conductive loop; and ii) increasing a width of a conductive loop to improve handling of increased current flows.

Figure 3:
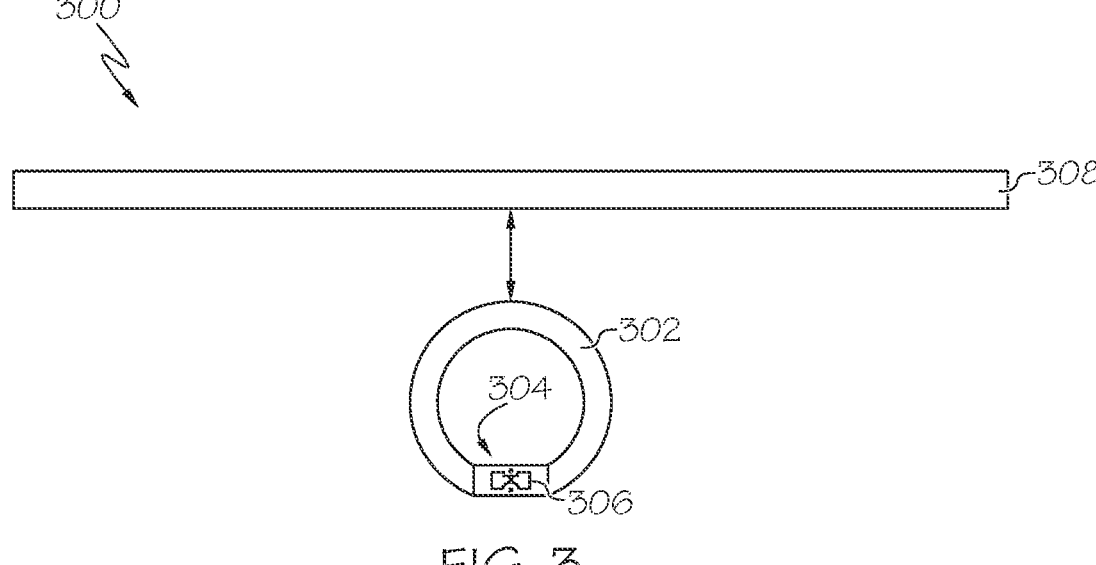
FIG. 3 illustrates an embodiment of an RFID system of the present disclosure involving the conductive loop with RFID chip in proximity of an Ultra High Frequency (UHF) dipole antenna to form a far field UHF RFID tag.

In another embodiment and as shown in FIG. 3, an RFID system 300 is provided. The RFID system 300 may include a conductive loop 302 with a gap 304, and an RFID chip 306 electrically connected across the gap 304. The RFID system 300 also includes an UHF antenna component 308. The conductive loop 302 is configured to couple to the Ultra High Frequency (UHF) antenna component 308 resulting in an RFID system 300 that participates in a far field UHF communication. FIG. 3 illustrates an embodiment of the RFID system wherein the conductive loop 302 has an RFID chip 308 electrically coupled to the conductive loop across the gap 304, with the conductive loop 302 being magnetically coupled to the UHF antenna 305.

In various embodiments, the UHF antenna component 308 may include a dipole antenna such as a bar type dipole antenna, a monopole antenna, a loop antenna or a slot antenna or an equivalent.

Figure 4:
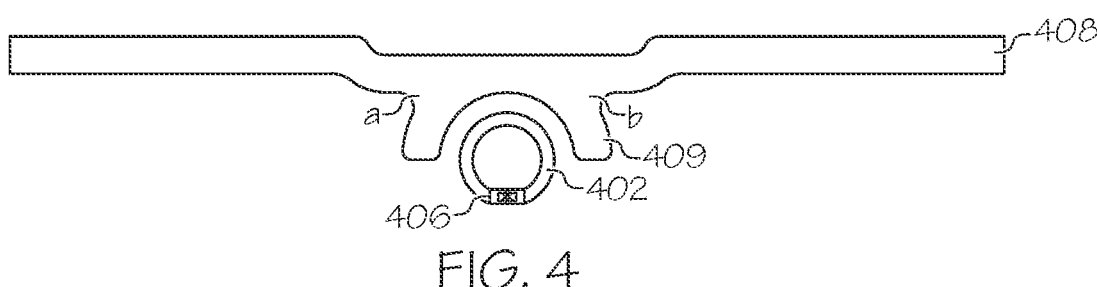
FIG. 4 illustrates an embodiment of the present RFID system with a portion of the UHF antenna being wrapped around the conductive loop.

As depicted in FIG. 4 involving an RFID system 400, a portion (a, b) of the UHF antenna 408 forms a contour 409 around a portion of the conductive loop 402. In the present embodiment, the contour 409 serves as a planar shielding, offering a further reduction of voltage build up or current flow around the conductive loop 402 when exposed to high-field radiation such as 2.45 GHz Microwave energy. This improves the protection for the RFID chip 406 under Microwave exposure.

Figure 5:
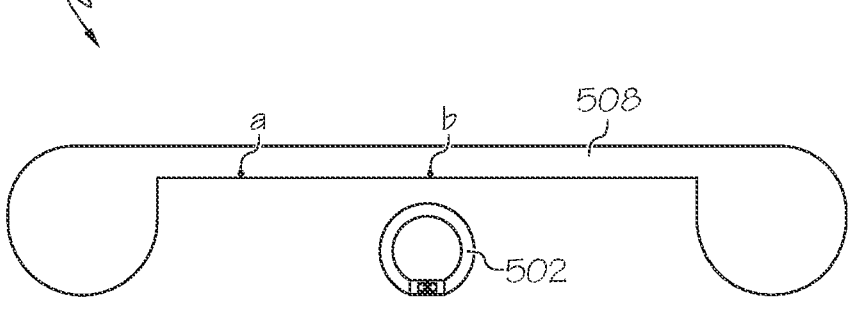
FIG. 5 illustrates an embodiment of the present RFID system comprising a UHF antenna and the conductive loop.

In yet another embodiment of the RFID system 500 as illustrated in FIG. 5, a conductive loop interacting with a UHF antenna is described. In the present embodiment, conductive loop 502 serves as a reactive loop and the UHF antenna component 508 is configured to provide two current peaks corresponding to 2.45 GHz and 915 MHz at two different regions thereon. For example, the current maxima at 2.45 GHz flows through a first region (a) and the current maxima at 915 MHz flow through a second region (b) on the UHF antenna component 508. The maximum magnetic field originates at the first region (a) at Microwave frequency and the best position to pick up maximum magnetic field at UHF frequency originates at second region (b). In other words, the position of maximum UHF current is the point of minimum 2450 MHz current, giving the minimum possible coupling at 2450 MHZ, thereby enhancing the protection for the RFID chip and tag. The relative positioning of the conductive loop 502 and the antenna component 508 causes a current maxima at UHF to flow through the first region on the UHF antenna component, and one of a current maxima and a current minima at MW to flow through the second region on the UHF antenna component.

Figure 6A:
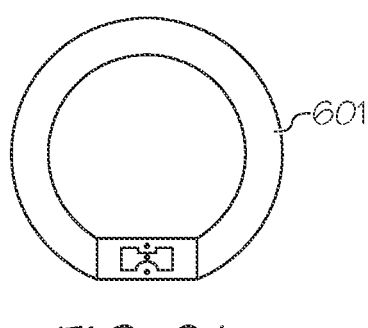
FIGS. 6A-6C illustrate alternative embodiments of the conductive loop with multiple turns.
Figure 6B:
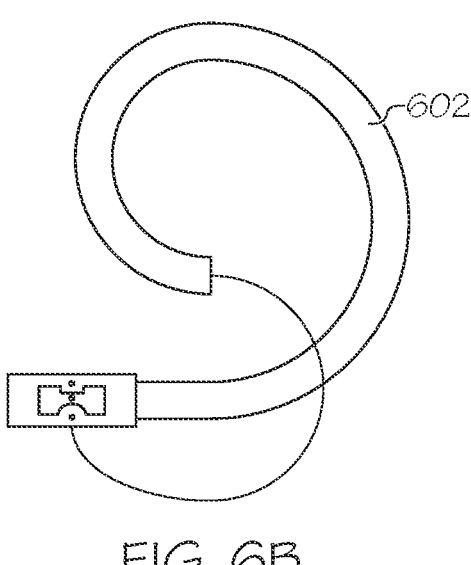
Figure 6C:
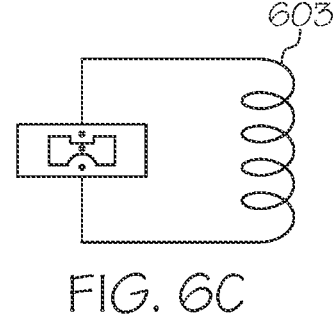

The conductive loop can be of different structures and variations according to an embodiment of the disclosure. In particular, the conductive loop can be of structures where multiple turns are used, increasing the inductance and hence allowing a conductive loop of relatively smaller dimension to be used to meet the required UHF resonance. For various embodiments, the smaller the dimension of the conductive loop, the less 2.45 GHz energy will be absorbed. FIG. 6A through 6C illustrates such varying or alternative structures of the conductive loop in RFID system in which the conductive loop can be a planar single turn loop 601, or a planar multi-turn loop 602. The conductive loop can also be a non-planar solenoid coil 603.

FIG. 7A through 7C illustrate additional embodiments of an RFID system involving alternative structures of the conductive loop 702. The conductive loop 702 is provided with one or more additional metallic structures inside the loop, such as in the form of a track or a disk. For some embodiments, the metallic structures act as a planar shield, shorting the field at 2.45 GHz. Preferentially, the metallic structures' interaction with the loop 702 is such that it forms a series resonant tuned circuit, forming a frequency selective bypass of microwave current around the RFID chip 706 accompanying the loop 702. The internal structure may be a broken loop, with a defined/predetermined capacitance at its ends forming a resonator at 2.45 GHz. For some embodiments, the combination of a planar shield/bypass and the small loop dimensions gives improved protection for the RFID chip 706. As shown in FIGS. 7A and 7B, for some embodiments, the conductive loop encloses a relatively smaller conductive loop 703 that defines an opening. In some embodiments, the smaller conductive loop 703 is a broken loop. As shown in FIG. 7C, for some embodiments, the conductive loop 703 shown in FIG. 7C encloses a conductive disk 704. The formation of the planar shield/bypass directs high-field energy away from the RFID chip and protects the RFID chip from damage. In the embodiments exemplified, the smaller conductive loop is configured as a planar shield to short a field at 2.45 GHz. The smaller conductive loop and the conductive disk described above are configured to interact with the conductive loop to form a series resonant tuned circuit, forming a selectively bypass frequency of microwave current around the RFID chip.

Figure 8:
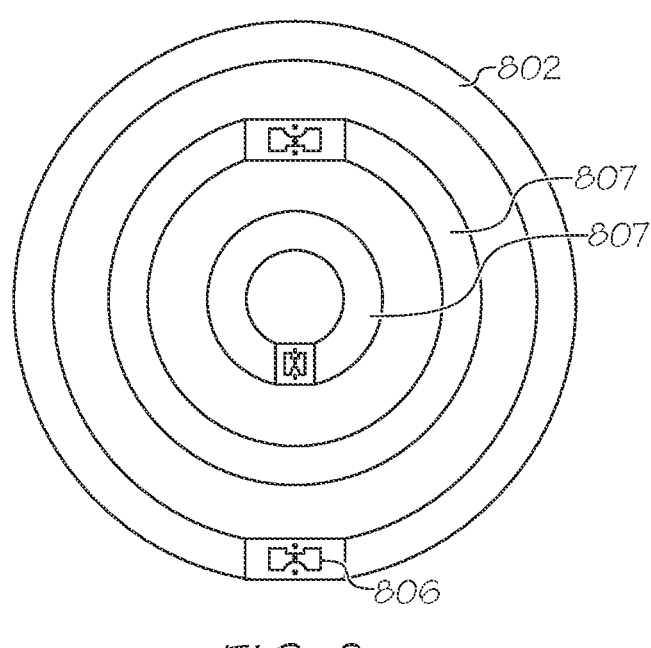
FIG. 8 illustrates another embodiment of the conductive loop enclosing multiple embedded loops inside.

In some embodiments, such as the embodiment illustrated in FIG. 8, a conductive loop 802 encloses multiple (e.g., two or more) embedded loops 807 including elements of parasitic capacitors or interdigital capacitors. Multiple embedded loops may be utilized to achieve a minimum pick up of energy at a MW frequency such as 2.45 GHz with a frequency selective bypass and a wanted resonance at UHF, for example, at UHF (e.g., 915 MHz). For example, the embedded loops 807 for some embodiments may allow primary resonance at UHF (e.g., 915 MHZ) with RFID chip 806 and secondary resonance at a MW frequency (e.g., 24.45 GHz) with parasitic or structural capacitance.

Figure 9A:
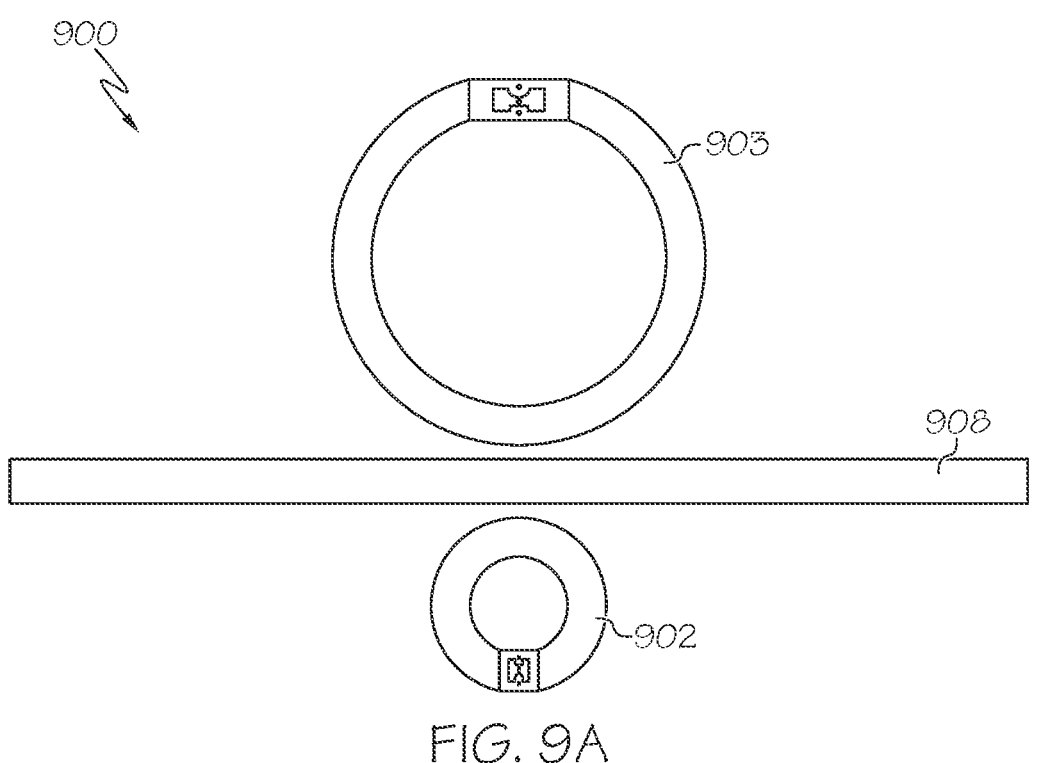
FIGS. 9A and 9B illustrate embodiments involving additional conductive loops defined by a larger dimension.
Figure 9B:
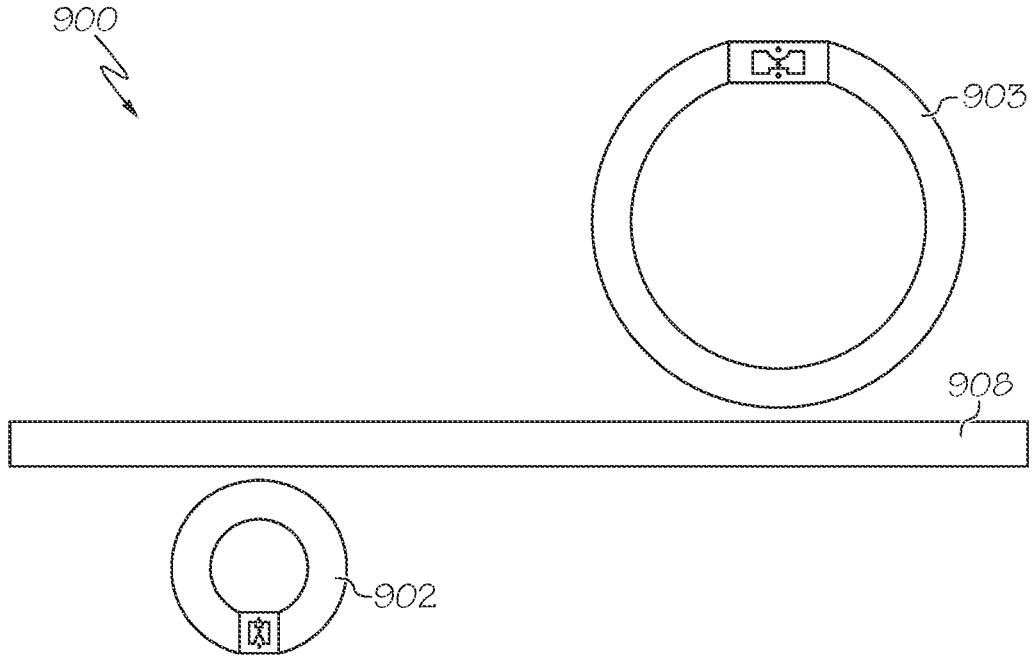

In some embodiments, such as in FIG. 9, an RFID system 900 includes two or more conductive loops. In some embodiments, two or more resonant structures including the conductive loop 902 and a second conductive loop 903 potentially with a larger dimension are used to manipulate the field by coupling the two or more resonant structures (e.g., both) to a common UHF antenna component 908. In the present embodiment, the conductive loop 902 is placed on one side of the UHF antenna component and the second conductive loop 903 is placed on an opposite side of the UHF antenna component. For example, some embodiments may use one or more first resonators that are self-resonant at 2.45 GHZ, such as a split ring resonator, and one or more second resonators, such as a UHF resonant loop operating at 915 MHz. Thus, both couple to a common UHF antenna either with common or different coupling positions (as shown in FIGS. 9A and 9B). For example, in the present embodiment, the conductive loop 902 is a UHF resonant loop, while the second conductive loop 903 is self-resonant at 2.45 GHz. The 2.45 GHz loop has wide lines to carry higher currents, and its position coupled to the dipole antenna such that it moves the current maximum at 2450 MHz away from the UHF conductive loop, hence reducing current flowing in the UHF conductive loop. A split ring resonator is one which is used get resonance where it is wanted. The embodiment of FIG. 9 ensures or makes it more likely that microwave energy does not enter the UHF conductive loop or reduces microwave energy that enters the conductive loop.

Figure 10:
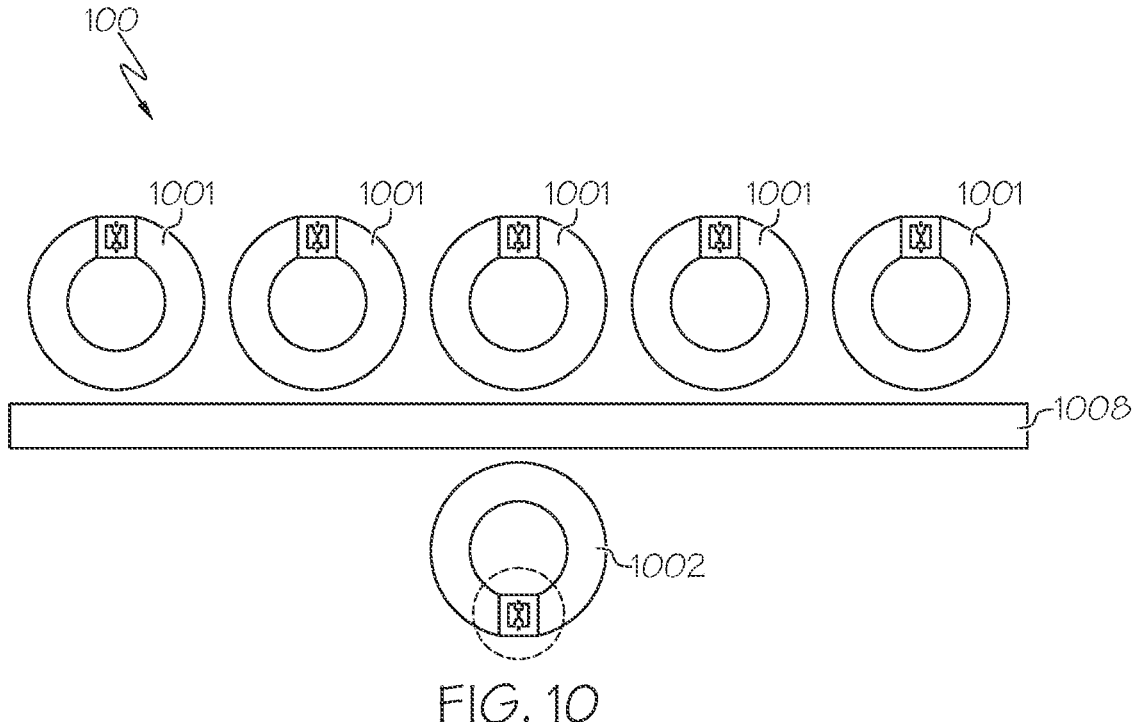
FIG. 10 illustrates another embodiment comprising multiple loops as traps.

In some embodiments, such as illustrated in FIG. 10 the RFID system 100 includes two or more loops as traps 1001. Such traps may be coupled to an antenna structure 1008 operating at either the same frequency or a spread of frequencies. For example, the antenna structure 1008 may operate and cover the 2400 MHz to 2500 MHz band that microwave ovens are typically allowed to operate in. In the present embodiment, the antenna structure 1008 is a UHF dipole antenna. The traps 1001 act to adsorb Microwave energy and also direct energy away from the UHF conductive loop 1002.

Figure 11:
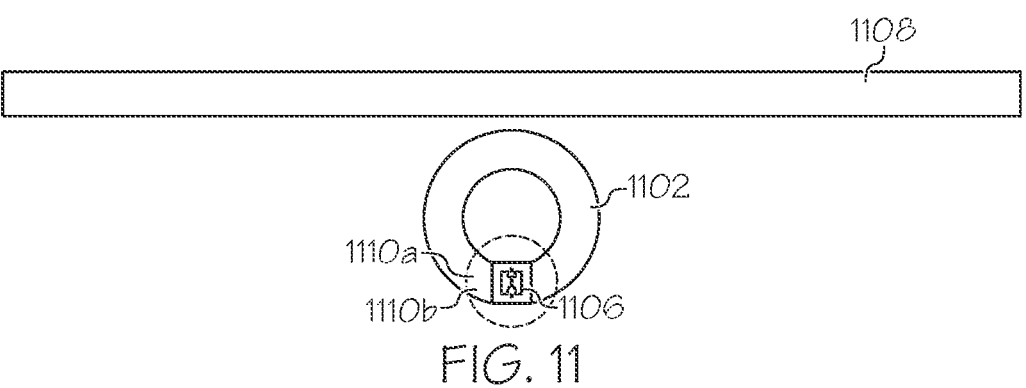
FIG. 11 illustrates an additional embodiment of the RFID system in which the conductive loop comprises a shielding structure electrically coupled to the conductive loop.

In some embodiments, such as illustrated in FIG. 11, the RFID system 1100 includes a shielding structure 1110 electrically coupled to the conductive loop 1102 across the gap and around the RFID chip 1106. The shielding structure 1110 may comprise a shielding conductor 1110a and a shielding dielectric 1110b. The shielding dielectric 1110b may be at least partially positioned between the shielding conductor 1110a and the RFID chip 1106. The shielding may allow the RFID system to achieve lower coupling across the gap of the conductive loop at 2.45 GHz. In the present embodiment, the diameter of the conductive loop 1102 is kept small. The combination of the shielding structure and the small diameter of the conductive loop 1102 provide a parasitic capacitance across the RFID chip 1106 such that a UHF resonator is achieved with a smaller diameter loop of wider lines. The combination also provides a bypass path for 2450 MHz energy.

Figure 12:
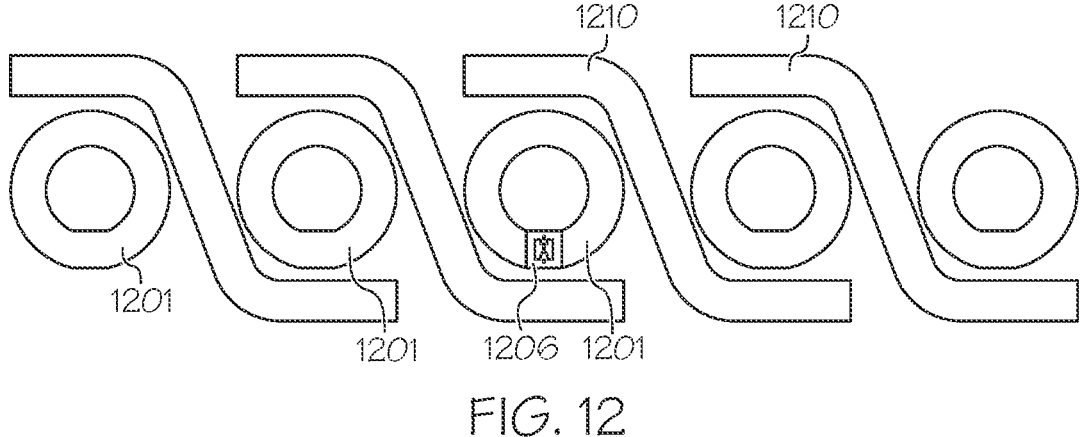
FIG. 12 illustrates another embodiment with antenna itself being a series of small UHF resonators.

In some embodiments, such as in FIG. 12, the UHF antenna component is formed by a series of small UHF resonators 1201. One resonator among the series of UHF resonators 1201 carries the RFID chip 1206, other resonators remain self-resonant. The resonators are in the form of loops and they couple to each other via lines 1210 placed between them or by magnetic coupling, such that only current at UHF can flow down, forming an antenna, but 2450 MHz energy does not flow. Each loop is a small fraction of the wavelength at 2450 MHz, therefore interaction with microwaves is limited.

Figure 13:
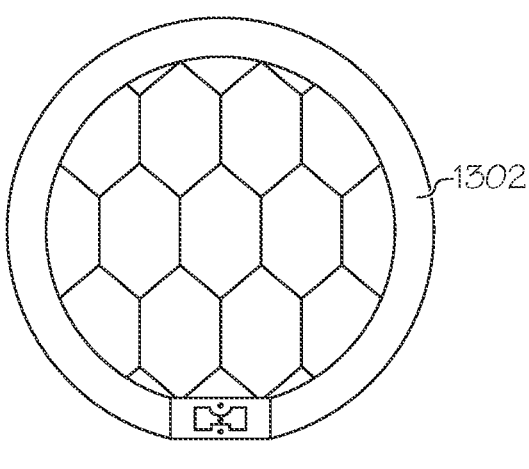
FIG. 13 illustrates yet another embodiment of the conductive loop in which a central area of the conductive loop is filled with a series of metal sections tessellated with small gaps.

In some embodiments, such as in FIG. 13, the one or more conductive loops are tessellated conductive loops 1302. For example, each tessellated conductive loop encloses a plurality of metal sections of any geometry, which may be separated from each other, such as by gaps, margins, indentations, cavities, channels, holes, perforations, or other shapes. The tessellated metal sections may reduce the effect of Microwave energy as the energy goes into each gap in tessellation. Tessellation may also prevent circulation of eddy currents, which may disrupt operation of the conductive loop.

Figure 14:
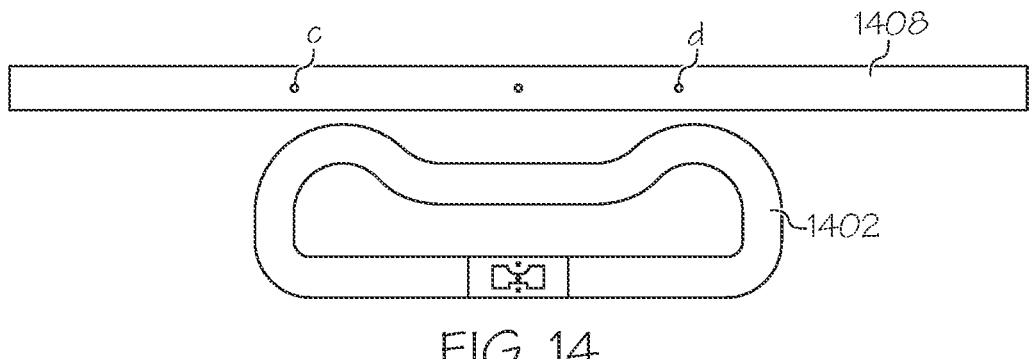
FIG. 14 illustrates an embodiment of the RFID system in which the conductive loop structure and the UHF antenna are positioned to induce anti-phase current under Microwave exposure in the conductive loop.

In some embodiments, such as in FIG. 14, the conductive loop 1402 is configured to couple with the antenna component 1408 at both UHF and microwave frequencies. In the present embodiment, the relative position between the conductive loop 1402 and the antenna component 1408 is such that the length between peak coupling positions is anti-phase, so current in the loop cancels. For example, a first peak coupling position (c) and a second peak coupling position (d) on the antenna component 1408 correspond to peak position at 2.45 GHz and peak position at 915 MHz respectively. The length of the conductive loop from the first peak coupling position to the second peak coupling position is configured to have measurements such that the second peak is in anti-phase to the first peak, thus cancelling resonance at the second peak coupling position.

As described earlier, an RFID tag which functions even after being microwaved may offer one or more benefits such as being more useful for inventory tracking by monitoring movement of item, and point of purchase sale. For example, it is a growing need in various business segments, particularly in food, beverage and meal dispensation services in restaurant setup to have real time tracking and tracing at an item-level for food/meal serving or delivery. Other benefits of real time tracking and monitoring may include reducing the chances of food expiring, improved demand forecasting, inventory management, and enhancement of the purchasing experience.

Figure 15:
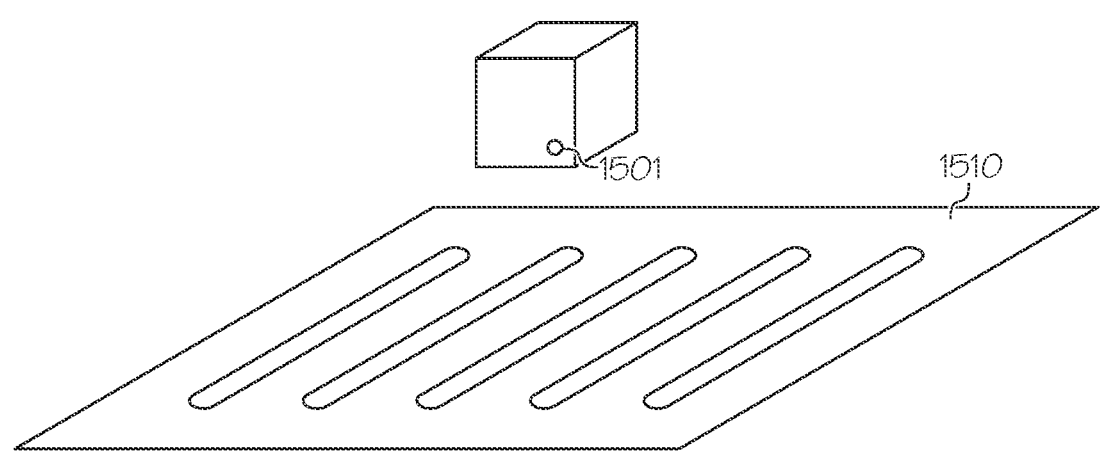
FIG. 15 illustrates a method of utilizing a conductive loop that it is tolerant to microwave exposure.
Figure 16:
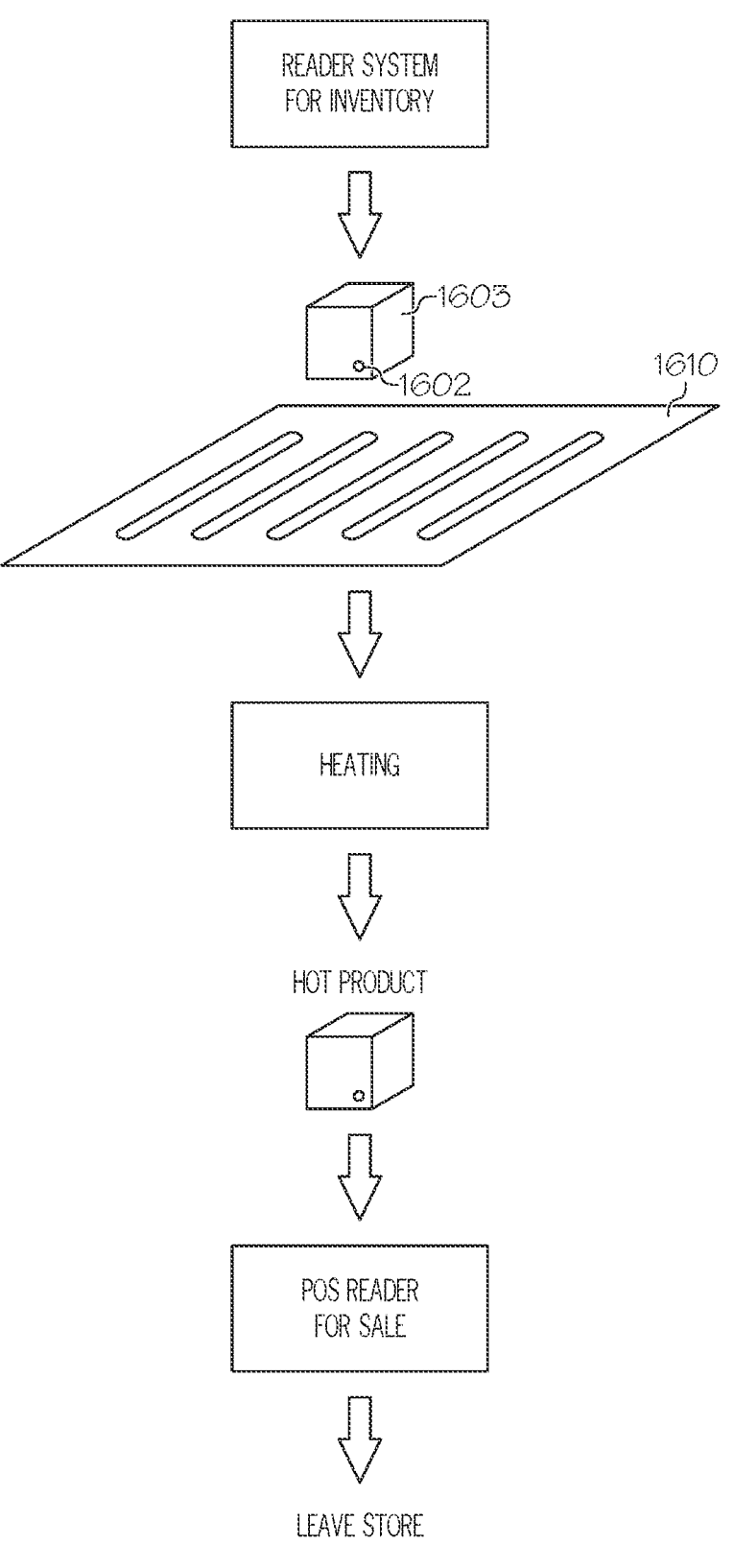
FIG. 16 illustrates an exemplary embodiment of a method of utilizing the conductive loop of FIG. 15 and conducting an inventory check.
Figure 17:
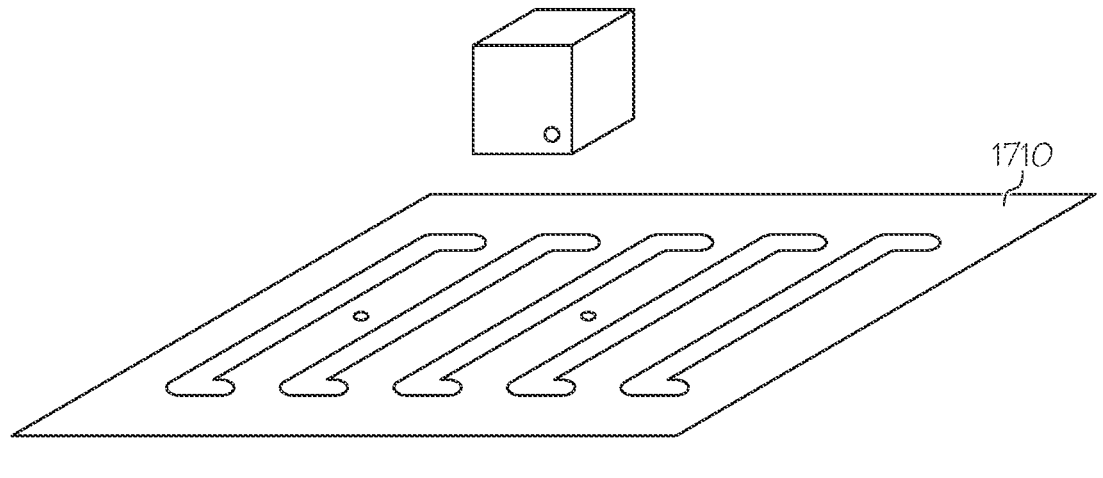
FIG. 17 illustrates an embodiment of an arrangement comprising a booster mat for coupling with the conductive loop.

In some embodiments, methods of utilizing the RFID system and the conductive loop for radio frequency communication with tolerance to Microwave Frequency exposure may include the operations and materials illustrated in FIGS. 15, 16, and 17. Various embodiments may include one or more of the following operations: First, the conductive loop may be small reactive conductive loop secured to a merchandising package, such as fast food intended to be cooked by exposure to Microwave Frequency. The conductive loop, as described before, may comprise an electrically coupled RFID chip around or across a gap, and the conductive loop may be dimensioned to be resonant at an Ultra High Frequency (UHF) and less or minimally resonant at Microwave Frequency (MW). The conductive loop may be secured to a bottom portion of the merchandising package. The RFID chip carries and may be fed with necessary information and data at least with regard to the merchandising package. This is followed by an inventory reading of the RFID chip by a far field reader through a far field radio frequency communication in which the conductive loop is coupled to one or more Ultra High Frequency (UHF) antennas. The loop may also be configured to provide short range RFID read capability at UHF frequencies, suitable for operations such as payment for an item, checking return status etc.

The merchandising package such as the food package tagged with the conductive loop can reside in a storage or display unit, which may be maintained under refrigerated or frozen condition. Buyers walking in can pick up a food package or item from the display unit and proceed to a check-out counter for payment after safely cooking the item in microwave oven and exposing the item to microwave frequency. Cooking can be done for a specific duration and strength. Because of the design of the RFID system and the RFID tag in the form of the conductive loop, regardless of the duration or strength of exposure, the RFID tag or other device may remain functional for communication post cooking. Thus, the conductive loop secured on the merchandising package may be read at a point of sale terminal to charge a consumer post exposure of the RFID device and merchandise package to Microwave Frequency (MW) exposure. For some embodiments of an RFID system, the RFID chip exhibits limited interaction with microwave energy and thus avoids destructive concentration of field current and overheating.

In some embodiments of the disclosure, such as illustrated in FIGS. 15 and 16, a small conductive loop 1501 may be attached to items or packages. Exemplary packages or items may include a tray carrying an item of food or the item of food itself. Food items may include meat, a ready meal etc. and other items may include re-usable items such as cups or plates. These items or food may need to be tracked at a location such as a merchandising, commercial sales, or restaurant environment and also at point of sale terminals. A booster mat 1510 or covering may be provided at the location. The mat 1510 operates as a far field UHF antenna. The small conductive loop 1501 may provide a short range RFID read capability at UHF frequencies, suitable for operations such as payment for an item, checking returns status, ownership etc. When placed on the mat 1510, the coupling between the conductive loop 1501 and a metallic structure forming part of the mat may temporarily create, as long as the loop is attached to or forms a part of a package resting on or otherwise is in proximity with the mat, a longer range RFID tag suitable for inventory. For example, a hand-held device may be used to read the contents of a refrigerated storage unit. Since the far field UHF antenna is not present when the food item is placed in the microwave oven, damage or any adversity resulting from the UHF far field antenna picking up microwave frequency can be advantageously avoided. By avoiding coupling additional energy to the small loop the probability of the RFID chip surviving the process is enhanced.

FIG. 16 illustrates exemplary hardware components and steps involved in an exemplary process of heating food items and their identification at food counters. A food item, such as a pack of noodles 1603, may include an RFID tag or other RFID device (not shown) comprising a conductive loop 1602 (as shown in any of the previous embodiments), and the pack of noodles may be stored in a refrigerator on a mat 1610 as previously described. For some embodiments, the mat 1610 may help boost transmission and/or receipt of signals by a handheld or other RFID reader. In various embodiments, the contents of the refrigerator can be easily inventoried remotely or locally using a hand-held or other reader when the mat 1610 and the conductive loop interact. The food item may be taken out of the refrigerator and placed into a microwave oven and heated. Due to the design and construction of the conductive loop in the RFID tag, the heating and microwave energy may have reduced effect in comparison with conventional designs, and the RFID tag may continue to be operable. The RFID device (e.g., an RFID tag, inlay) of the heated item may then be read, such as at a point of sale terminal to charge a consumer for the item without the need for a cashier or member of staff to handle the sale.

In some embodiments, such as illustrated in FIG. 17, a booster mat 1710 may help improve RFID performance. A part of the booster mat structure may couple to the conductive loop as it is brought out from under the merchandise to an edge, such that the dielectric loading of items such as meat or cheese doesn't prevent effective communication between an RFID device and an RFID reader. In various embodiments, the RFID device may be composed of the conductive loop.

Figures 18A, 18B:
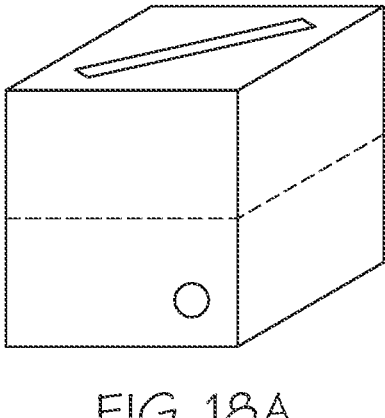
FIGS. 18A and 18B illustrate an arrangement for stacking merchandising package secured with the conductive loop in a shelf and using a booster mat to enhance read range of radio communication.

In some embodiments, such as in FIG. 18A through 18B, a food item or package may have a conductive loop on a base and a microwave safe strip of metal on top of the package. The items can be stacked onto a shelf with a mat.

As shown in FIG. 18B, a stack of items 1, 2, 3, and 4 may each have a conductive loop and microwave safe strip of metal as discussed above. The bottom loop on package 4 may be positioned to couple to a mat disposed below item 4. By coupling the bottom loop to the mat, a longer range function for an RFID device is obtained. In various embodiments, the conductive loops associated with items 1, 2, or 3 may be too far away from the mat to use the metallic structures in it to boost performance. Each of the loops associated with items 1, 2, or 3 may couple with the top conductor on the item disposed directly below through the loop in the stack, thus allowing a longer read range for all the RFID small loops in the stack. For various embodiments, each of the loops may be configured as one of the embodiments disclosed herein that is able to remain operable even after being contained in a microwave oven being used to heat a food item. In various embodiments, each loop is configured and positioned to be sufficiently remote from a corresponding booster strip to prevent 2.45 GHz energy from being coupled into it from the corresponding booster strip.

Figure 19:
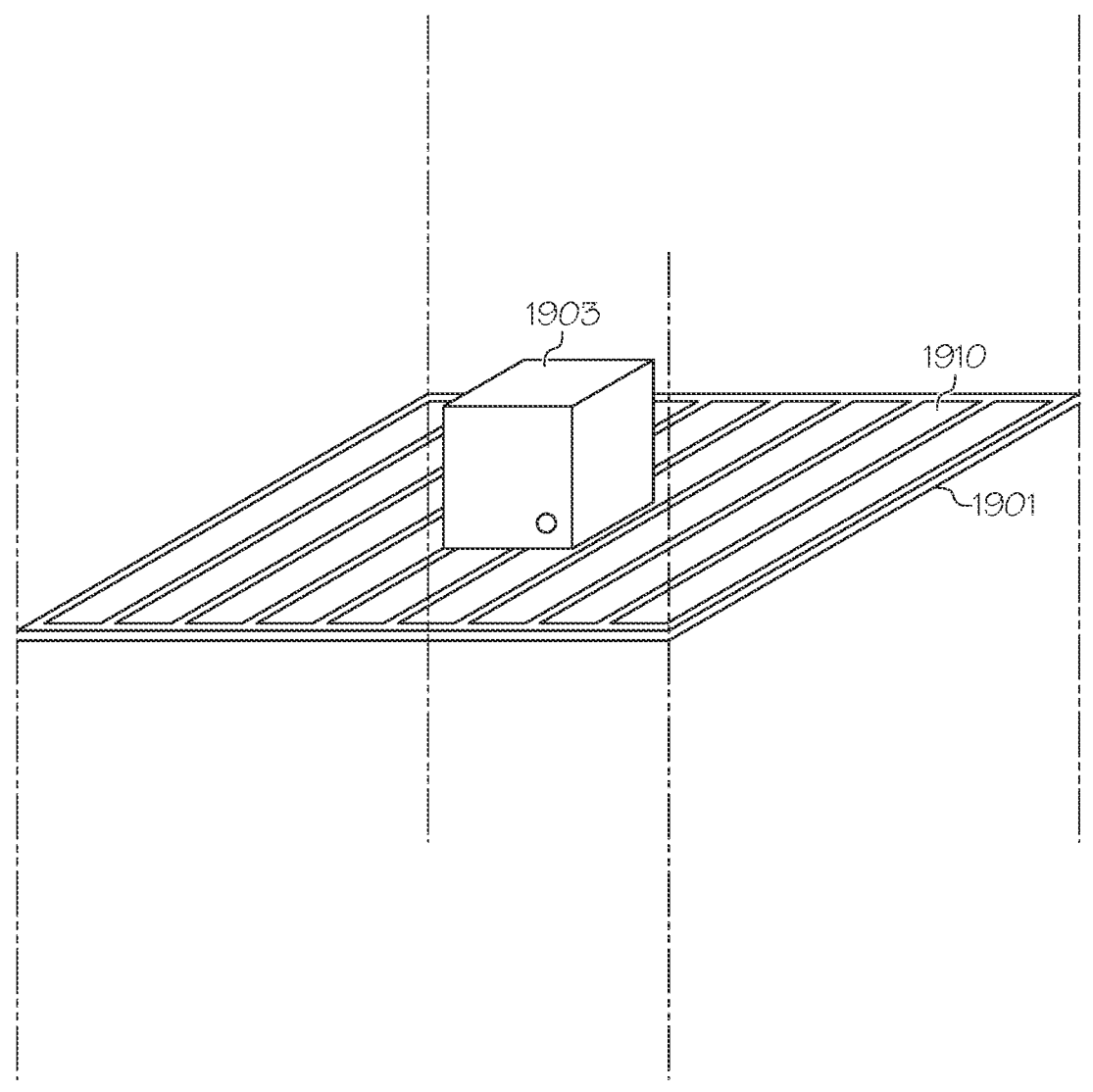
FIG. 19 illustrates an embodiment of an arrangement in which a conductive shelf in a storage or display unit operates as a booster antenna for the conductive loop.

In some embodiments, such as in FIG. 19, a conductive shelf in a storage or display unit 1901 operates as booster antenna mat 1910 for the conductive loop 1902 in the RFID tag secured to the food item or package 1903. For some embodiments, the conductive shelf is composed of a grid of stainless steel wires which are relied upon by the conductive loop to boost its performance as previously described.

Figure 20:
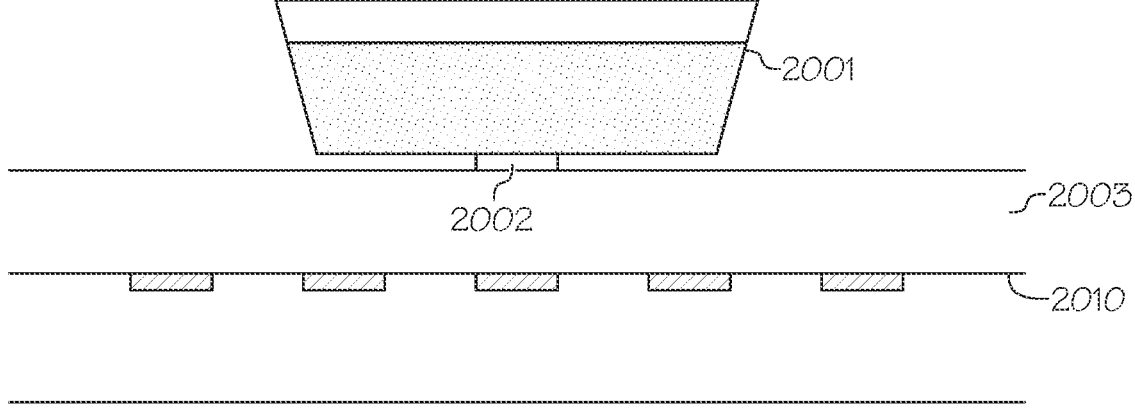
FIG. 20 illustrates another embodiment of boosting communication performance involving the conductive loop wherein the mat employs a dielectric spacer between the merchandising package containing food of nature that absorbs or adsorbs UHF frequency.

In some embodiments, such as in FIG. 20, a food item in a container 2001 with the conductive loop 2002 is coupled to a mat 2010 that has a dielectric spacer 2003 between the conductive elements and the food product. Some food items, such as fresh meat and cheese, adsorb UHF energy, being effectively high loss dielectrics. However, for some embodiments, the relative permeability is effectively 1, so they may not interact magnetically with a Radio Frequency field. The conductive loop may have a primary magnetic response, so it may have reduced interaction with high loss dielectric items. The booster may radiate in the far field to achieve the wanted range, which involves an electric field component that will interact with the product in proximity to it. In this embodiment the booster mat is covered by a dielectric such as a foam or plastic; the increased distance between the loop and the metal elements in the mat, reduces performance, but the lower dielectric loading from the product may increase the mats effectiveness, giving an overall improved performance. In a further embodiment, the spacer may have magnetic properties to increase the coupling of the conductive loop to the mat conductors.

What has been described above includes examples of the claimed subject matter. It may be, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter may be intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

Glossary

Conductive Loop—a conductive loop may include an antenna which could be of different dimensions, shapes, or sizes and which is of conductive metal through which electromagnetic energy can propagate. Every piece of electrically conductive material has some degree of coupling with radiation fields out in the real world. The conductor configured as an antenna may be designed to provide high coupling efficiency between certain media.

Resonance—This may occur when two things such as two frequencies or waves are moving in unison or in lock step. An antenna may be configured to match the frequency of the incoming field in order to setup a resonance between the antenna component and the field/frequency. Resonance may be based on a multiple of the wavelengths of interest.

Primary Resonance—relates to a maximum energy peak for a specified field/frequency at a corresponding position and/or design of an antenna.

Secondary Resonance—relates to a position and/or design of an antenna when limited energy is peaked at a specified field/frequency.

Coupling—it is the matching of a tag and the reader or two items allowing electromagnetic energy propagation, so that they can communicate effectively together at the same frequency. Every piece of electrically conductive material has some degree of coupling with radiation fields out in the real world. Only when the conductor is designed to provide high coupling efficiency between certain media it is called and antenna.

What is claimed is:

1. A radio frequency identification (RFID) system comprising:
    at least one Ultra High Frequency (UHF) antenna component, wherein the UHF lies in a range between 860 MHz to 930 MHz;
    at least one conductive loop coupled to a RFID chip and having a largest dimension that is smaller than the wavelength of radiation transmitted at a Microwave Frequency (MW) of 2.45 GHz, wherein the conductive loop is configured to couple with the UHF antenna component,
    wherein the conductive loop and the antenna component are positioned relative to each other to cause the conductive loop to have peak resonance within the UHF range and sufficiently limited resonance at the MW to prevent arcing in a microwave,
    wherein a maximum dimension of the conductive loop is up to 30% of a longest wavelength of radiation transmitted at the MW to prevent destructive field concentration and arcing during microwave exposure.

2. The RFID system of claim 1, wherein the at least one conductive loop defines a gap and the RFID chip is electrically coupled to the conductive loop across the gap.

3. The RFID system of claim 1, wherein the antenna component is selected from the group consisting of a dipole antenna, a monopole antenna, a loop antenna, or a slot antenna.

4. The RFID system of claim 1, wherein the conductive loop exhibits primary resonance at the UHF range.

5. The RFID system of claim 1, wherein the conductive loop exhibits secondary resonance at the MW.

6. The RFID system of claim 1, wherein the conductive loop is magnetically coupled to the antenna component.

7. The RFID system of claim 1, wherein relative positioning of the conductive loop and the antenna component causes a current maxima at UHF to flow through a first region on the UHF antenna component, and one of a current maxima and a current minima at MW to flow through a second region on the UHF antenna component.

8. The RFID system of claim 1, wherein the maximum dimension of the conductive loop is up to 25% of the longest wavelength of radiation transmitted at the MW.

9. The RFID system of claim 1, wherein the maximum dimension of the conductive loop is up to 20% of the longest wavelength of radiation transmitted at the MW.

10. The RFID system of claim 1, wherein the maximum dimension of the conductive loop is up to 15% of the longest wavelength of radiation transmitted at the MW.

11. The RFID system of claim 1, wherein a portion of the antenna component forms a contour around a portion of the conductive loop.

12. The RFID system of claim 11, wherein the contour formed by the antenna component forms a planar shielding around a portion of the conductive loop.

13. The RFID system of claim 1, wherein the conductive loop is configured to have peak resonance within the UHF range at the location of minimum resonance at the MW.

14. The RFID system of claim 1, wherein the conductive loop is a planar single turn loop.

15. The RFID system of claim 1, wherein the conductive loop is a planar multi-turn loop.

16. The RFID system of claim 1, wherein the conductive loop is a non-planar solenoid coil.

17. The RFID system of claim 1, wherein the conductive loop encloses a smaller conductive loop, the smaller conductive loop defining an opening, wherein the smaller conductive loop is configured as a planar shield to short a field at 2.45 GHz.

18. The RFID system of claim 17, wherein the smaller conductive loop is in the form of a track or a disk shape.

19. The RFID system of claim 17, wherein the smaller conductive loop and the conductive disk are configured to interact with the conductive loop to form a series resonant tuned circuit, forming a selectively bypass frequency of microwave current around the RFID chip.

20. The RFID system of claim 19, wherein the second conductive loop and the conductive loop are coupled to the antenna component at a common coupling position.

21. The RFID system of claim 17, wherein the smaller conductive loop is configured to have a predetermined capacitance at its ends, so as to form a resonator at 2.45 GHz.

22. The RFID system of claim 1, wherein the conductive loop encloses a conductive disk, wherein the smaller conductive disk is configured as a planar shield to short a field at 2.45 GHz.

23. The RFID system of claim 1, wherein the conductive loop encloses multiple embedded loops, at least one of which includes an element of a parasitic capacitor or an interdigital capacitor.

24. The RFID system of claim 1, further includes a second conductive loop having a largest dimension that is bigger than the largest dimension of the conductive loop, the second conductive loop coupled to being configured to operate at the MW and to direct energy away from the conductive loop by adsorbing microwave energy.

25. The RFID system of claim 24, wherein the second conductive loop is a split ring resonator.

26. The RFID system of claim 24, wherein the conductive loop is coupled to the antenna component at a different coupling position than the second conductive loop.

27. The RFID system of claim 1, further comprising a plurality of trap loops along one side of the antenna component and the conductive loop on an opposite side of the antenna component.

28. The RFID system of claim 27, wherein each trap loop of the plurality of trap loops is configured to have the same or a different resonance frequency in the MW.

29. The RFID system of claim 1, further comprising a shielding structure electrically coupled to the conductive loop across the gap, and around the RFID chip.

30. The RFID system of claim 29, wherein the shielding structure comprises a shielding conductor and a shielding dielectric, the shielding dielectric being positioned at least partially between the shielding conductor and the RFID chip.

31. The RFID system of claim 1, wherein the antenna component is formed utilizing a plurality of conductive loops each configured to reduce its interaction with radiation at the MW, and each conductive loop being configured to couple to at least an adjacent conductive loop via lines by resonating at the UHF.

32. The RFID system of claim 1, wherein the conductive loop is a tessellated conductive loop, wherein the tessellated conductive loop encloses a plurality of metal sections separated from each other.

33. The RFID system of claim 1, wherein the conductive loop is configured to have a first peak coupling position and a second peak coupling position at the MW, and wherein the length of the conductive loop from the first peak coupling position to the second peak coupling position is configured to create anti-phase cancelling radiation.

34. A conductive loop for radio frequency communication, comprising
   a gap and an RFID chip electrically coupled to the conductive loop across the gap, the conductive loop being configured to have peak resonance at an Ultra High Frequency (UHF),
   wherein the UHF lies in a range between 860 MHz to 930 MHz and having a largest dimension that is smaller than the wavelength of radiation transmitted at Microwave Frequency (MW) of 2.45 GHZ, and
   wherein a maximum dimension of the conductive loop is up to 30% of a longest wavelength of radiation transmitted at the MW to prevent destructive field concentration and arcing during microwave exposure.

35. The conductive loop of claim 34, wherein the type of radio frequency communication is near-field-communication.

36. The conductive loop of claim 34, wherein the type of radio frequency communication is far field communication, and wherein the conductive loop is configured to couple to an Ultra High Frequency antenna component.

37. The conductive loop of claim 36, wherein the coupling between the Ultra High Frequency antenna component and the loop is a magnetic coupling.

38. The conductive loop of claim 34, wherein the maximum dimension of the conductive loop is up to 30% of the wavelength of the MW.

39. The conductive loop of claim 34, wherein the maximum dimension of the conductive loop is 25% of the wavelength of the MW.

40. The conductive loop of claim 34, wherein the maximum dimension of the conductive loop is 20% of the wavelength of the MW.

41. The conductive loop of claim 34, wherein the maximum dimension of the conductive loop is 15% of the wavelength of the MW.

42. A method of utilizing a conductive loop for radio frequency communication with tolerance to Microwave Frequency exposure, the method comprising:

receiving a microwavable merchandising package having the conductive loop configured to resist exposure to Microwave Frequency (MW) and having an RFID chip, the conductive loop being coupled to the RFID chip, the conductive loop having a largest dimension that is smaller than the wavelength of radiation transmitted at a Microwave Frequency of 2.45 GHZ, wherein the conductive loop is configured to be operable at an Ultra High Frequency (UHF), and wherein the UHF lies in a range between 860 MHz to 930 MHz;

conducting an inventory reading of the microwavable merchandising package through a far field radio frequency communication by coupling the conductive loop to at least one UHF antenna, wherein the conductive loop and the at least one UHF antenna is positioned relative to each other to cause the conductive loop to have peak resonance within the UHF range and sufficiently limited resonance at the MW to prevent arcing in a microwave, wherein a maximum dimension of the conductive loop is up to 30% of a longest wavelength of radiation transmitted at the MW to prevent destructive field concentration and arcing during microwave exposure;

cooking the microwavable merchandising package by exposing the merchandising package to the MW radiation in a microwave cavity; and reading the RFID chip associated with the conductive loop directly in a near field communication employing a near field reader.

43. The method of claim 42, wherein the conductive loop defines a gap and the RFID chip is electrically coupled to the conductive loop across the gap.

44. The method of claim 42, wherein the conductive loop is secured to a bottom of the merchandising package.

45. The method of claim 42, wherein the merchandising package includes a fast food item.

46. The method of claim 42, wherein the merchandising package is stored in a refrigerator and is inventoried using a remote reader using far field communication.

47. The method of claim 42, wherein the conductive loop secured on the merchandising package is read at a point of sale terminal to charge a consumer post the MW exposure.

48. The method of claim 42, wherein the conductive loop accompanying the RFID chip exhibits limited interaction with the MW exposure, and is configured to avoid destructive concentration of field current and overheating.

49. The method of claim 42, wherein conducting the inventory reading of the microwaveable merchandising package comprises placing the package having the conductive loop over a booster mat for coupling at the UHF.

50. The method of claim 49, wherein the booster mat is provided in a conductive shelf, refrigeration unit, storage unit, or display unit used for inventorying or at point of sale terminal.

51. The method of claim 49, wherein the booster mat comprises a dielectric spacer to increase coupling with the conductive loop.

* * * * *